United States Patent
Hawthorne et al.

[15] 3,668,232
[45] June 6, 1972

[54] N-SUBSTITUTED 2-AMINOMETHYL-2'-BIPHENYLCARBOXYLIC ACID AND DERIVATIVES

[72] Inventors: John O. Hawthorne; Edward L. Mihelic, both of Penn Hills Township, Allegheny County, Pa.

[73] Assignee: United States Steel Corporation

[22] Filed: May 21, 1970

[21] Appl. No.: 39,554

Related U.S. Application Data

[60] Division of Ser. No. 825,440, May 16, 1969, which is a continuation-in-part of Ser. No. 529,258, Feb. 23, 1966, abandoned.

[52] U.S. Cl..................260/471 A, 260/518 R, 260/239.3 T
[51] Int. Cl..............................C07c 101/00, C07c 101/42
[58] Field of Search......................260/471 R, 471 A, 518 R Primary Examiner—Lorraine A. Weinberger
Assistant Examiner—R. S. Weissberg
Attorney—Gene Harsh

[57] ABSTRACT

N-substituted 2-aminomethyl-2'-biphenylcarboxylic acid and derivatives thereof are prepared by reacting 2-formyl-2'-biphenylcarboxylic acid or an ester thereof with ammonia or a primary amine with hydrogenation of the product.

7 Claims, No Drawings

N-SUBSTITUTED 2-AMINOMETHYL-2'-BIPHENYLCARBOXYLIC ACID AND DERIVATIVES

This application is a division of our co-pending application, Ser. No. 825,440, filed May 16, 1969, which in turn is a continuation-in-part of application Ser. No. 529,258, filed Feb. 23, 1966, now abandoned.

The application relates to N-substituted 2-aminomethyl-2'-biphenylcarboxylic acid and derivatives thereof and a method for their preparation. The compounds are useful as intermediates in the preparation of 6-substituted-6,7-dihydro-5H-dibenz[c,e]-azepines. The latter have adrenolytic properties and may be used to inhibit or reverse the physiological effect of epinephrine (U.S. Pat. No. 3,075,966).

This invention provides compounds having the following general structural formula

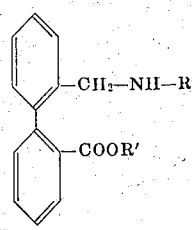

wherein R is hydrogen, a lower alkyl radical preferably having one to three carbon atoms such as methyl, ethyl, propyl or isopropyl; aryl containing only one benzene ring system and preferably phenyl or tolyl; cycloalkyl containing a five or six member carbon ring and preferably cyclopentyl or cyclohexyl; or aralkyl containing only one benzene ring system, preferably benzyl. The preferred compounds of the invention are those wherein R is lower alkyl having one to three carbon atoms. R' may be hydrogen or lower alkyl preferably containing one to three carbon atoms such as methyl, ethyl, propyl or isopropyl. The compounds of this invention are preferably prepared by reacting 2-formyl-2'-biphenylcarboxylic acid under reducing conditions with ammonia or a primary amine, the organic radical of which corresponds to the radical R in the foregoing formula. Thus, in addition to ammonia, suitable compounds are methylamine, ethylamine, propylamine, isopropylamine, aniline, para-tolylamine, cyclopentylamine, cyclohexylamine, benzylamine and the like.

If instead of the acid, a lower alkyl ester of the acid such as the methyl, ethyl, propyl or isopropyl ester of 2-formyl-2'-biphenylcarboxylic acid is used, compounds having the general formula

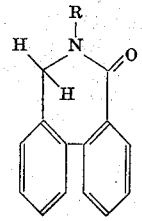

wherein R represents the same radicals as above are produced except where aniline is the starting material and then ring closure does not occur so that one obtains a lower alkyl 2-phenylaminoethyl-2'-biphenylcarboxylate. Hydrolysis of the latter type of ester gives the corresponding amino acid.

The reactant 2-formyl-2'-biphenylcarboxylic acid or the lower alkyl ester thereof is readily prepared from the ozonolysis of phenanthrene [P. S. Bailey, Journal of the American Chemical Society, Volume 78, 3811 (1956)].

The process of the invention involves the reaction of 2-formyl-2'-biphenylcarboxylic acid or its lower alkyl ester with ammonia or a primary amine under reducing conditions preferably in the presence of a polar solvent that is inert to the reactants under the reaction conditions. It is also preferred to carry out the reaction in the presence of a catalyst such as nickel, palladium or platinum. The reaction is carried out at a temperature in the range of from about 20° C to about 150° C, preferably 50° to 100° C. The reaction may be carried out at atmospheric temperature or at higher pressures up to about 150 psig. The reaction time is adjusted within the discretion of the operator to give a satisfactory yield. Generally speaking, at the reaction conditions set forth above a reaction time for a batch process of 1.5–30 hours is preferred.

Any suitable polar solvent that is inert to the reactants under the reaction conditions may be used including, for example, methanol, ethanol, tetrahydrofuran, dioxane and the like.

It is preferred to use at least one mole of ammonia or primary amine per mole of the acid or ester reactant, preferably a slight excess of the ammonia or amine is used. The presence of the solvent is not strictly necessary but it is preferred that the reaction product is dissolved in the solvent, preferably a lower alkanol for succeeding stages of reaction. The initial novel product of the invention can be isolated, however, if desired. This primary reaction product need not be isolated prior to formation of the azepinone which may in turn be used to prepare an azepine useful as set forth above.

The use of the compounds of the present invention as starting materials for the azepines is illustrated by the following sequence of reactions. Examples 1–6 illustrate reaction I, Example 7 illustrates reaction II, Examples 8–12 illustrate reaction III, Examples 13 and 14 illustrate reaction IV and Example 15 illustrates reaction V.

In Examples 1, 2, 8 and 9, R is methyl. In Examples 5, 11 and 12, R is benzyl. In Examples 6, 13 and 14, R is phenyl. In Examples 3, 4, 7, 10 and 15, R is hydrogen.

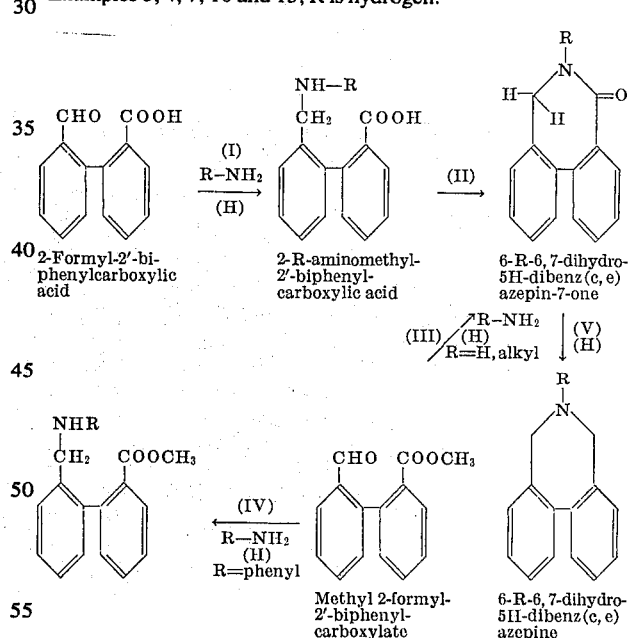

The invention is further illustrated by the following specific examples:

EXAMPLE 1

An aqueous (30 percent) solution of monomethylamine (4.4 ml, 0.044 mole) was added to 2-formyl-2'-biphenylcarboxylic acid (4.5 g, 0.02 mole) in ethanol (50 ml). Raney nickel catalyst (0.2 g) was added, and the mixture was shaken under hydrogen (50 psig) at 50° C for 20 hours. After venting and removal of the catalyst and solvent, the crude product (5.2 g), m.p. 160°–185° C, remained. Recrystallization from methanol and then water gave 2-methylaminomethyl-2'-biphenylcarboxylic acid (2.1 g), m.p. 224°–226° C (decomposition occurs, hereinafter abbreviated, dec.).

EXAMPLE 2

2-Formyl-2'-biphenylcarboxylic acid (6.0 g, 0.0265 mole) in methanol (20 ml) and 30 percent aqueous monomethylamine (4.0 ml) were refluxed for 15 minutes.

Sodium hydrosulfite (12 g) in water (100 ml) was added, and the solution was refluxed for 1.3 hours. The volume was reduced to 50 ml and cooled to 20° C. Impure 2-methylaminomethyl-2'-biphenylcarboxylic acid (4.8 g), m.p. 203°–210° C, was collected. Purification gave a product melting at 220°–224° C (dec.).

EXAMPLE 3

A solution of 2-formyl-2'-biphenylcarboxylic acid (4.5 g, 0.02 mole), 28 percent ammonium hydroxide (6.0 ml, 0.1 mole), and ethanol (50 ml) was contacted with hydrogen (50 psig) at 50° C for 20 hours over Raney nickel catalyst (0.2 g). Removal of catalyst and solvent gave a solid (5.0 g) melting at 180°–186° C (dec.). Recrystallization from water gave pure 2-aminomethyl-2'-biphenylcarboxylic acid hemihydrate, m.p. 197°–199° C (dec.).

EXAMPLE 4

Ammonium hydroxide (28 percent, 1.5 ml) and 5 percent palladium on alumina (0.2 g) were added to a solution of 2-formyl-2'-biphenylcarboxylic acid (2.26 g, 0.01 mole) in methanol (25 ml). The mixture was contacted with hydrogen (60 psig) at 40° C for 1.5 hours. Removal of the catalyst and solvent gave a residue, recrystallization of which from water (50 ml) gave 2-aminomethyl-2'-biphenylcarboxylic acid hemihydrate (2.03 g), m.p. 197°–199° C (dec.).

EXAMPLE 5

A solution of 2-formyl-2'-biphenylcarboxylic acid (4.52 g, 0.02 mole) and benzylamine (2.35 g, 0.022 mole) in ethanol (50 ml) was contacted with hydrogen (55 psig) for 30 hours at 80° C over Raney nickel catalyst (0.1 g). After venting the hydrogen, methanol (200 ml) was added, and the mixture was heated to reflux. After removal of the catalyst by filtration from the hot solution, the volume of the filtrate was reduced to 50 ml. On cooling, 2-benzylaminomethyl-2'-biphenylcarboxylic acid (3.66 g), m.p. 202°–206° C (dec.), separated. An additional 0.84 g of product was isolated by concentrating the mother liquor. Recrystallization from methanol gave pure material, m.p. 204°–206° C (dec.).

EXAMPLE 6

2-Formyl-2'-biphenylcarboxylic acid (4.52 g) was reacted under the conditions for Example 5 with aniline (2.04 g, 0.022 mole) for 24 hours. After removal of ethanol, the crude product (6.59 g) was triturated with cold methanol (20 ml). 2-Phenylaminomethyl-2'-biphenylcarboxylic acid (2.2 g), m.p. 150°–153° C, was insoluble and was collected. Recrystallization from ethyl acetate-n-heptane gave the pure compound, m.p. 153°–155° C.

EXAMPLE 7

The cyclization of the amino acids to lactams is illustrated by 2-aminomethyl-2'-biphenylcarboxylic acid. The amino acid (0.36 g) was heated at 140° C for 3 hours at 1 mm of mercury pressure. The material was then sublimed at that pressure and at 200° C. 6,7-dihydro-5H-dibenz[c,e]-azepin-7-one (0.28 g), m.p. 194°–196° C, was collected.

EXAMPLE 8

A solution of methyl 2-formyl-2'-biphenylcarboxylate (3.0 g, 0.0125 mole) and 30 percent aqueous monomethylamine (3.0 ml) in 95 percent ethanol (25 ml) was contacted with hydrogen (50 psig) at 50° C for 20 hours over Raney nickel catalyst (0.2 g). Removal of solvent and catalyst after venting the hydrogen gave the crude product (2.75 g), m.p. 142°–146° C. Recrystallization from methanol gave pure 6-methyl-6,7-dihydro-5H-dibenz[c,e]azepin-7-one, m.p. 148°–149° C.

EXAMPLE 9

The procedure was the same as in Example 7, except that the hydrogenation catalyst was 5 percent palladium on alumina with a reaction time of 1.5 hours. Removal of solvent and catalyst gave 6-methyl-6,7-dihydro-5H-dibenz[c,e]azepin-7-one (2.79 g), m.p. 148°–149° C.

EXAMPLE 10

A solution of methyl 2-formyl-2'-biphenylcarboxylate (6.00 g, 0.025 mole) and 28 percent ammonium hydroxide (6 ml) in 95 percent ethanol (50 ml) was contacted with hydrogen (50 psig) at 50° C for 20 hours over Raney nickel catalyst (0.2 g). Removal of catalyst and solvent after venting gave the crude product (5.34 g), m.p. 143°–150° C. Recrystallization from benzene gave 6,7-dihydro-5H-dibenz[c,e]azepin-7-one (4.00 g), m.p. 191°–194° C. Melting point of the pure compound is 194°–195° C.

EXAMPLE 11

Benzylamine (1.37 g, 0.0128 mole) was added to methyl 2-formyl-2'-biphenylcarboxylate (3.0 g, 0.0125 mole) in methanol (25 ml). The solution was refluxed for 15 minutes. A solution of sodium hydrosulfite (15 g) in water (75 ml) was added, and the mixture was refluxed for 1.5 hours. The mixture was cooled to ambient temperature, and the aqueous phase was decanted from a precipitated oil. A benzene solution of the oil was washed with water and dried over potassium hydroxide. After evaporation of the benzene on a steam bath, the oil was dissolved in n-heptane (100 ml). Upon concentrating the volume to approximately 30 ml and cooling the solution, crystals of 6-benzyl-6,7-dihydro-5H-dibenz[c,e]azepin-7-one (2.66 g), m.p. 111°–113° C, formed. Recrystallization from methanol gave the pure compound, m.p. 114°–115° C.

EXAMPLE 12

A solution of methyl 2-formyl-2'-biphenylcarboxylate (2.40 g, 0.01 mole) and benzylamine (1.10 g, 0.01 mole) in methanol (25 ml) was contacted with hydrogen (60 psig) over 5 percent palladium-on-alumina catalyst (0.2 g) for 2 hours at 40° C. After venting the hydrogen, the catalyst and solvent were removed to leave the crude product (3.2 g). This material was dissolved in ethyl ether and reacted with hydrogen chloride. The crystalline hydrochloride that formed was largely dissolved in water (100 ml). A small quantity of insoluble material was removed by filtration. The aqueous filtrate was neutralized by 7 percent aqueous sodium bicarbonate solution. The precipitated product was recrystallized from isopropyl alcohol to give 6-benzyl-6,7-dihydro-5H-dibenz[c,e]azepin-7-one (2.03 g), m.p. 112°–113° C.

EXAMPLE 13

A solution of methyl 2-formyl-2'-biphenylcarboxylate (3.00 g, 0.0125 mole) and aniline (1.19 g, 0.0128 mole) in toluene (25 ml) was refluxed for 0.75 hours. Water of reaction was collected in a Dean-Stark trap. The oil resulting from the removal of the toluene was dissolved in 95 percent ethanol (25 ml) and contacted with hydrogen (55 psig) over Raney nickel catalyst (0.2 g) for 24 hours at 60° C. Removal of catalyst and solvent gave the crude product (3.77 g), m.p. 61°–69 C. Recrystallization from isopropyl alcohol gave methyl-2-phenylaminomethyl-2'-biphenylcarboxylate, m.p. 76°–77 C.

EXAMPLE 14

A solution of methyl 2-formyl-2'-biphenylcarboxylate (2.40 g, 0.01 mole) and aniline (1.0 g, 0.01 mole) in methanol (25 ml) was contacted with hydrogen (60 psig) over 5 percent palladium-on-alumina catalyst (0.2 g) for 2 hours at 40° C. Removal of catalyst and solvent gave the crude product (3.03 g), m.p. 70°–73° C. Recrystallization from isopropyl alcohol gave methyl 2-phenylaminomethyl-2'-biphenylcarboxylate (2.18 g), m.p. 75°–77° C.

EXAMPLE 15

6,7-Dihydro-5H-dibenz[c,e]azepin-7-one (3.00 g) was reduced to 6,7-dihydro-5H-dibenz[c,e]azepine by the action of lithium aluminum hydride (0.8 g). An ether (200 ml) suspension of the hydride was refluxed in a Soxhlet extractor, in which a thimble contained the azepinone. After 21 hours of extraction, the residual hydride was decomposed by water. Inorganic material was removed by filtration, and ether was evaporated from the filtrate. The residue was refluxed with water (250 ml) and concentrated hydrochloric acid (1 ml). Unreacted azepinone (0.76 g) was collected by filtering the suspension while it was hot. The aqueous filtrate was cooled and made basic with 5 percent aqueous sodium hydroxide solution. The precipitated oil was extracted into ether, and the ether extract was dried over potassium hydroxide pellets.

It is to be understood that the foregoing working examples are given for the purpose of illustration and that any other suitable amine, temperature, pressure or the like, could be used provided that the teachings of this disclosure are followed.

We claim:
1. Compounds having the general formula

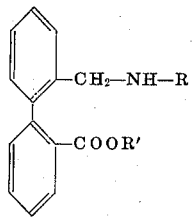

wherein R is hydrogen, a lower alkyl radical, aryl containing only one benzene ring system, cycloalkyl containing a five or six member carbon ring, or aralkyl containing only one benzene ring system, and R' is hydrogen or lower alkyl.

2. The compounds of claim 1 wherein R is hydrogen, lower alkyl containing 1-3 carbon atoms, phenyl, cyclohexyl or benzyl, and R' is hydrogen or lower alkyl containing 1-3 carbon atoms.

3. Methyl 2-phenylaminomethyl-2'-biphenylcarboxylate.
4. 2-Aminomethyl-2'-biphenylcarboxylic acid.
5. 2-Methylaminomethyl-2'-biphenylcarboxylic acid.
6. 2-Benzylaminomethyl-2'-biphenylcarboxylic acid.
7. 2-Phenylaminomethyl-2'-biphenylcarboxylic acid.

* * * * *